United States Patent [19]
Buchner et al.

[11] Patent Number: 5,471,572
[45] Date of Patent: Nov. 28, 1995

[54] SYSTEM AND METHOD FOR ADDING DETAIL TO TEXTURE IMAGERY IN COMPUTER GENERATED INTERACTIVE GRAPHICS

[75] Inventors: Gregory C. Buchner, Sunnyvale; Robert A. Drebin, Mountain View, both of Calif.

[73] Assignee: Silicon Graphics, Inc., Mountain View, Calif.

[21] Appl. No.: 88,349

[22] Filed: Jul. 9, 1993

[51] Int. Cl.$^6$ .................................................. G06T 5/00
[52] U.S. Cl. ........................... 395/139; 395/133; 395/128
[58] Field of Search ................................... 395/119, 120, 395/123, 127, 128, 129, 130, 133, 136, 139, 141; 382/18, 19, 27, 28, 30, 41, 47, 54, 56

[56] References Cited

U.S. PATENT DOCUMENTS 4,974,176  11/1990  Buchner et al. ........................ 395/128
5,148,497   9/1992  Pentland et al. ........................ 382/54

OTHER PUBLICATIONS

Stephen A. Zimmerman, "Applying Frequency Domain Constructs To A Broad Spectrum of Visual Simulation Problems", 1987 Image Conference IV Proceedings, Jun. 1987.

Kenneth R. Castleman, *Digital Image Processing*, Chapter 8, "Geometric Operations", pp. 110–115, Prentice-Hall (1979).

William Dungan, Jr. et al., "Texture Tile Considerations for Raster Graphics", pp. 130–136, SIGGRAPH 1978 Proceedings, vol. 12 #3, Aug. 1978.

*Primary Examiner*—Almis R. Jankus
*Attorney, Agent, or Firm*—Sterne, Kessler, Goldstein & Fox

[57] ABSTRACT

An apparatus and method for interactively magnifying a base texture to generate a generally unblurred magnified image of the base texture is disclosed. The present invention includes a base texture generator for filtering a high resolution source image to generate a base texture. A detail texture generator extracts a representative portion of high frequency information from the source image to generate a detail texture, wherein the detail texture comprises the extracted representative portion of high frequency information. An image magnifier, which is coupled to the base texture generator and the detail texture generator, augments the generated base texture with high frequency information from the detail texture to thereby generate a magnified image of the generated base texture at a particular level of detail.

18 Claims, 9 Drawing Sheets

FIG. 7A
DETAIL TEXTURE

|   | 0 | 1 | 2 | 3 | 4 | 5 | 6 | 7 |
|---|---|---|---|---|---|---|---|---|
| 0 | a | b | c | d | e | f | g | h |
| 1 | i | j | k | l | m | n | o | p |
| 2 | q | r | s | t | u | v | w | x |
| 3 | y | z | 0 | 1 | 2 | 3 | 4 | 5 |
| 4 | 6 | 7 | 8 | 9 | 0 | @ | # | $ |
| 5 | ! | % | ^ | & | * | ( | ) | { |
| 6 | } | [ | ] | ; | ' | : | " | < |
| 7 | > | , | . | / | ? | ` | ~ | * |

FIG. 7B
BASE TEXTURE (LOD[0])

|   | 0 | 1 | 2 | 3 |
|---|---|---|---|---|
| 0 | a | b | c | d |
| 1 | e | f | g | h |
| 2 | i | j | k | l |
| 3 | m | n | o | p |

FIG. 7C

|   | 0 | 1 | 2 | 3 | 4 | 5 | 6 | ... |
|---|---|---|---|---|---|---|---|---|
| 0 | a | b | c | d | e | f | g | h | a |
| 1 | i | j | k | l | m | n | o | p | i |
| 2 | q | r | s | t | u | v | w | x | q |
| 3 | y | z | 0 | 1 | 2 | 3 | 4 | 5 | y |
| 4 | 6 | 7 | 8 | 9 | 0 | @ | # | $ | 6 |
| 5 | ! | % | ^ | & | * | ( | ) | { | ! |
| 6 | } | [ | ] | ; | ' | : | " | < | } |
| ... | > | , | . | / | ? | ` | ~ | * | > |
|   | a | b | c | d | e | f | g | h |   |

IMAGE 708

FIG. 8

SYSTEM AND METHOD FOR ADDING DETAIL TO TEXTURE IMAGERY IN COMPUTER GENERATED INTERACTIVE GRAPHICS

BACKGROUND OF THE INVENTION

CROSS-REFERENCE TO OTHER APPLICATIONS

The following application of common assignee contains some common disclosure, and is believed to have an effective filing date identical with that of the present application:

U.S. patent application entitled "A System and Method for Sharpening Texture Imagery in Computer Generated Interactive Graphics", by Bob Drebin and Greg Buchner, now U.S. Pat. No. 5,438,654, incorporated herein by reference in its entirety.

1. Field of the Invention

The present invention relates generally to texture imagery in computer generated interactive graphics, and more particularly to adding detail to texture imagery in computer generated interactive graphics.

2. Related Art

A typical computer generated image comprises a plurality a polygons. Each polygon may contribute to one or more pixels of the final image (a pixel is a picture element of a display means), wherein each of the pixels may have a unique color based on such attributes as intrinsic color, lighting (specular highlights, shading, shadows, etc.), atmospheric effects (fog, haze, etc.), and texture. As is well known, textures are conventionally used to provide visual detail for polygon surfaces.

Conventional computer image generation systems store varying levels of detail (LOD) of texture data. LOD is described in many publicly available documents, such as "Texture Tile Considerations for Raster Graphics", William Dugan, Jr., et al., SIGGRAPH 1978 Proceedings, Vol. 12 #3, August 1978, which is herein incorporated by reference in its entirety.

Figure 1A:
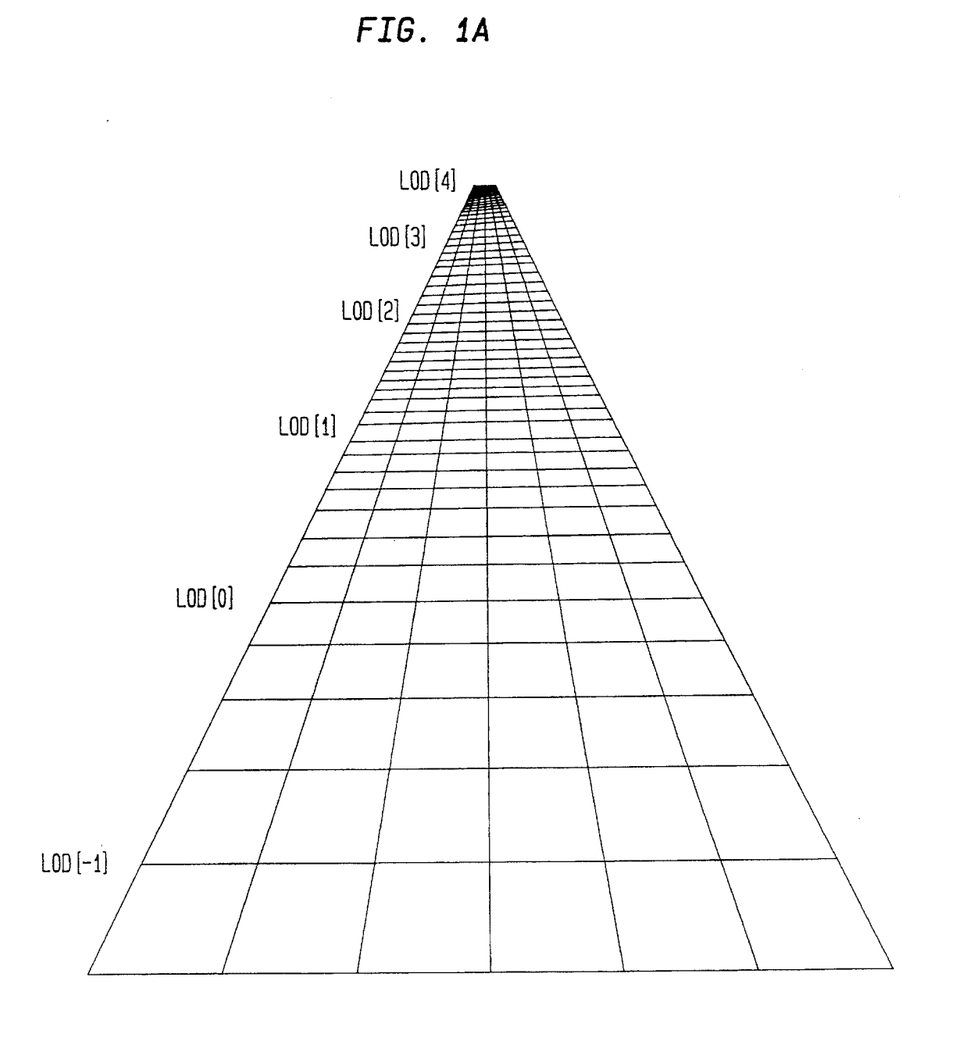
FIG. 1A illustrates a texture in perspective relative to the image (pixel) plane as well as the relative positions of various LODs.
Figure 1B:
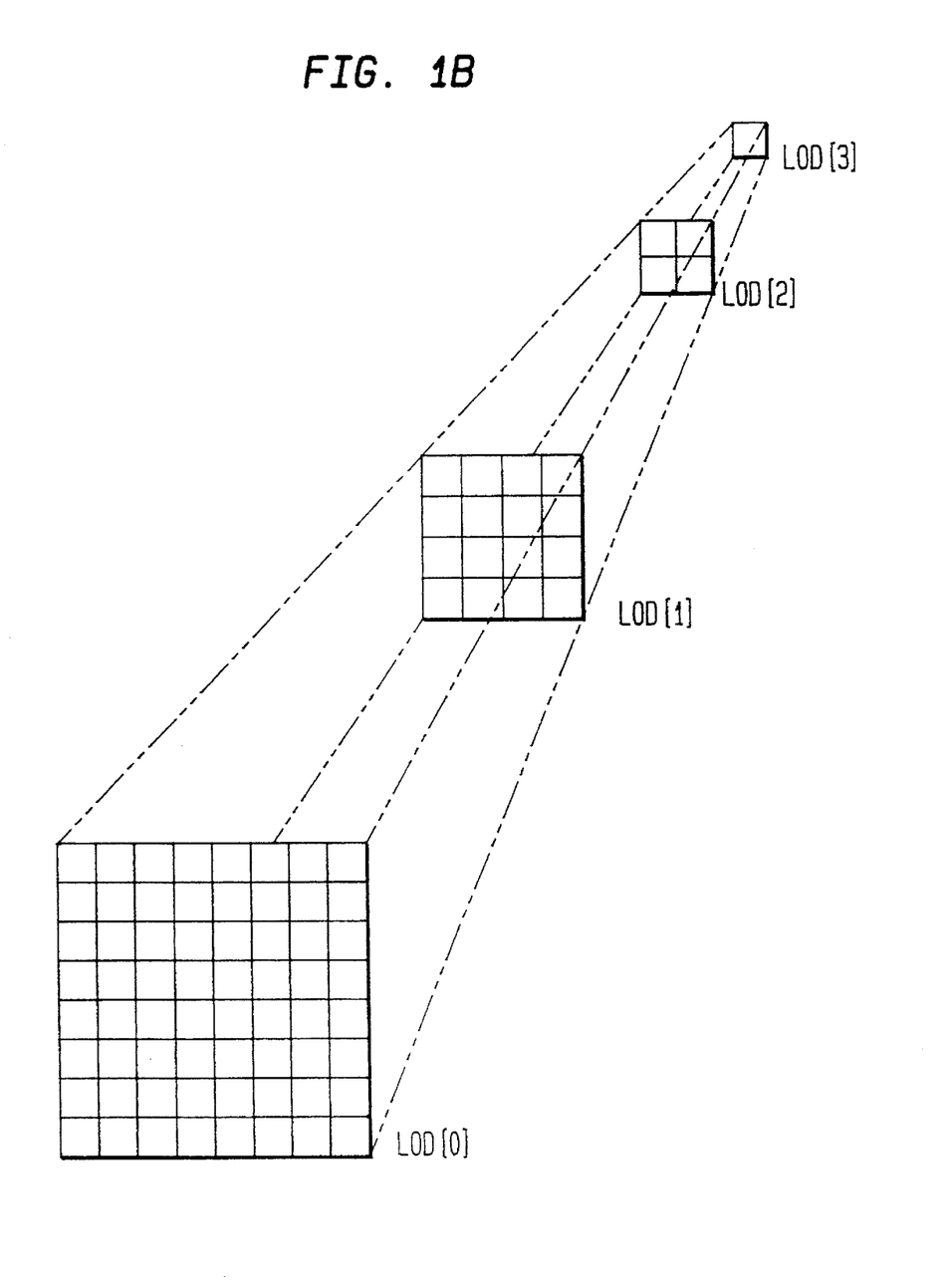
FIG. 1B illustrates the different resolutions of the texture typically stored at integer LOD intervals.

FIG. 1B illustrates the LODs stored for a particular image. LOD[0], also called the base texture, is shown in FIG. 1B as being an 8×8 texture. The base texture LOD[0] is the highest resolution texture. LOD n represents the base texture LOD[0] magnified by a factor of $2^{-n}$ (other magnification factors could also be used). Thus, LOD[1] is a 4×4 texture, LOD[2] is a 2×2 texture, and LOD[3] is a 1×1 texture.

LODs of resolutions greater than the base texture LOD[0] are usually not stored due to memory limitations. For example, the memory requirement to store LOD[−1] (a 16×16 texture) is four times that to store LOD[0]. Similarly, a system which stores six LODs (that is, LOD[−1], LOD[−2], ..., LOD[−6]) of resolutions greater than LOD[0] would require over 8,000 times more memory than a system which stores only LOD[0] (and LODs lower in resolution than LOD[0]). Thus, storing LODs of greater resolution than the base texture LOD[0] is expensive and not practical.

A conventional texture technique is to map a two dimensional grid of texture data to an initially constant color polygon. This technique produces high quality results as long as an approximately 1:1 ratio of texture elements (texels) to display elements (pixels) is maintained. During successive magnification operations, LODs of greater and greater resolution are required to maintain the 1:1 ratio. Often, the required magnification is such that the 1:1 ratio cannot be maintained even when the base texture LOD[0] is used. In such cases (in conventional systems), data from the base texture are interpolated to perform the magnification. However, this results in an image lacking sufficient high frequency detail since the content of a single texture cell significantly affects more than one pixel of a display means (a cell is the smallest unit of characteristic definition that is accessible by the system).

More particularly, one problem that occurs when the required magnification is such that the 1:1 ratio of texel to pixel cannot be maintained even when the base texture LOD[0] is used is that the texture lacks sufficient detail for close-ups as a result of over magnification.

A conventional approach for solving this problem (i.e., lacking sufficient detail) is described in U.S. Pat. No. 4,974,176 to Buchner et al. entitled "Microtexture For Close-In Detail". This patent describes a system for providing apparent texture detail by adding random noise to a base texture. While being a technological advance, this system is flawed in that the detail added to the texture is not related to the original source image from which the base texture was derived.

Thus, what is required is a system and method that provides sufficient detail for close ups, when the image is magnified beyond the resolution of the base texture LOD[0], without having to store textures of higher resolution than the base texture LOD[0].

SUMMARY OF THE INVENTION

The present invention is directed to an apparatus and method for interactively magnifying a base texture to generate a generally more detailed magnified image of the base texture. The apparatus of the present invention is adapted for use with an interactive computer graphics processing system, and includes an off-line base texture generator for filtering a high resolution source texture map to generate a base texture. An off-line detail texture generator extracts a representative portion of the high-frequency information from the source texture to generate a detail texture, wherein the detail texture represents the characteristics of the high frequency information filtered out during the creation of the base texture. An image magnifier, which is coupled to the base texture generator and the detail texture generator, augments the generated base texture with high frequency information from the detail texture to thereby generate a magnified image of the generated base texture at a particular level of detail.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

I. Overview of the Present Invention

The present invention is directed to a system and method for adding detail to texture imagery in computer generated interactive graphics, such that storage requirements needed to create textured imagery in computer generated interactive graphics are reduced. More particularly, the present invention is directed to a system and method for combining texture specific frequency information to a low-resolution version of a texture map such that the resulting image is similar to that which would be generated by using a high-resolution version of the same texture map in such a manner that the overall storage is greatly reduced.

The goal is to generate high resolution textured images across a large range of perspective. For example, a textured road (see FIG. 1A) when viewed in perspective may cover the entire "near" portion of an image while converging to a single image element, or pixel, in the far portion. If a texture is mapped to the surface of the road, and the dimension of the texture across the road is smaller than the number of pixels across the display, then the near scene portion of the texture will be magnified and the far scene minified. The present invention addresses the magnification case. Conventionally, the magnified portion would be interpolated and appear blocky as one texture element, or texel, contributes significantly to more than one pixel. One solution would be to store a different version of the texture which contains more texels (higher resolution) such that a 1:1 ratio of texel to pixel can be achieved in the near scene. The drawback of such an approach is that significantly larger amounts of texture storage are needed which is very costly and in most cases not practical.

We refer to the higher resolution version of the texture map (that is impractical to store) as the source texture. The lower resolution version of the texture map that can be practically stored will be referenced as the base texture. The base texture is typically a lowpass filtered version of the source texture. The high frequency information lost during the filtering process will be referred to as the frequency band map. A representation of the frequency content characteristic of the frequency band map will be referred to as the detail texture.

Briefly, the present invention addresses the texture magnification problem by providing a means in which an image can be generated that is similar in content to the image that would be created if the high resolution source texture were used by using the lower resolution base texture and the detail texture. The total storage required for the base texture and the detail texture are typically orders of magnitude smaller when compared to the storage requirements if the source texture were used.

In the present invention, the high frequency information in the detail texture is combined with the base texture on a per-pixel basis in accordance with each pixel's magnification factor and with the position of each pixel's mapping into the texture. The magnification factor, or level-of-detail (LOD), is a function of the rate of change of the texture address in each of the X and Y dimensions across the textures' mapping onto the pixel. More specifically, it is the log base 2 of maximum address delta for the X and Y dimensions. The more negative the LOD, the greater the magnification factor. As the magnification factor increases, more detail is needed to produce an image similar to that which would have been created had the high resolution source texture been used. This is done by using a function of the LOD to scale the magnitude of the contents of the characteristic frequency information stored in the detail texture before it is combined with the base texture.

The present invention preferably operates with high resolution source images having high frequency and low frequency information, wherein the high frequency information is not strongly correlated to the low frequency information. Such high resolution source images include images having a uniform color and texture variation throughout, such as a road, a field of grass, or a wood panel with a uniform grain.

In accordance with a preferred embodiment of the present invention, the detail texture contains information representing the characteristics of the high frequency components of the source texture not present in the base texture. Because the high frequency components are virtually the same throughout the high resolution source texture (since the high frequency information is not strongly correlated to the low frequency information), this characteristic frequency information can be derived from a small area of the source texture to create a detail texture of a size similar to the small area.

The characteristic frequency information stored in the detail texture can be used to represent the high frequency detail across the entire high resolution source texture. Since the detail texture size is smaller, typically much smaller than the high resolution source texture, the overall storage requirements are greatly reduced.

Consequently, the present invention allows a particular class of low-resolution textured imagery (that is, imagery corresponding to high resolution source images whose high frequency information is not strongly correlated to its low frequency information) to appear the same as if it had been processed using much higher-resolution textures. This permits reduced texture storage while maintaining high resolution image detail.

The present invention operates generally as follows. Varying levels of detail (LODs) of texture data for a high resolution source image are stored. Referring to FIG. 1B, at least the base texture LOD[0] (representing the highest resolution texture associated with the high resolution source image) is stored. Preferably, LOD n represents the base texture LOD[0] magnified by a factor of $2^{-n}$, although other magnification factors could be used. Lower resolution textures may also be stored, such as LOD[1], LOD[2], and LOD[3].

A detail texture, or characteristic frequency band map, for the high resolution source image is the generated. The detail texture stores high frequency imagery which is characteristic of the high-resolution source image, yet above the cutoff frequency of the base texture, LOD[0]. More particularly, if the high resolution source image represents LOD[−N], then the detail texture stores imagery characteristic of the high frequency information that would be present in the next N textures of greater resolution than the base texture LOD[0]. For example, suppose the high resolution source image is a 1024×1024 image, and the base texture LOD[0] is 128×128. In this example, the high resolution source image represents LOD[−3], and the detail texture stores the imagery characteristic of the high-frequency information that is present in LOD[−1], LOD[−2], and LOD[−3].

During magnification, the high frequency information stored in the detail texture is accessed, scaled, and combined with the base texture LOD[0] to thereby generate the texture at the desired level of magnification. More particularly, the high-frequency information from the detail texture is scaled, then the scaled high-frequency information is added to the base image. The scaling of the high-frequency information stored in the detail texture is a function of the magnification factor and the image content.

The operation of the present invention, as just described, is based on the following proposition: the texture at LOD [N−M] can be reconstructed from the texture at LOD[N] plus the difference between the texture at LOD[N−M] and LOD[N]. This proposition was identified by the inventors and can be represented by the Equation 1:

$$\text{texture}(LOD[N-M]) = \text{texture}(LOD[N]) + (\text{texture}(LOD[N-M]) - \text{texture}(LOD[N])) \quad \text{Equation 1}$$

In accordance with the present invention, a frequency band map is equal to the difference between the textures at two different LODs. The frequency band map for the range between LOD[N−M] and LOD[N] is shown by Equation 2:

$$\text{frequency\_band\_map}(LOD[N-M] \rightarrow LOD[N]) = \text{texture}(LOD[N-M]) - \text{texture}(LOD[N]) \quad \text{Equation 2}$$

In accordance with the present invention, a detail texture containing the characteristic frequency information of the frequency_band_map(LOD[N−M]−>LOD[N]) can be used to represent the frequency band map:

$$\text{detail\_texture}(LOD[N-M] \rightarrow LOD[N]) = \text{frequency\_band\_map}(LOD[N-M] \rightarrow LOD[N]) \quad \text{Equation 3}$$

Consequently, the general equation for the approximate texture(LOD[N−M]) is:

$$\text{texture}(LOD[N-M]) = \text{texture}(LOD[N]) + \text{detail\_texture}(LOD[N-M] \rightarrow LOD[N]) \quad \text{Equation 4}$$

It is common practice to interpolate between two adjacent resolutions of a texture (i.e., LOD[X] and LOD[Z]) to produce a textured image at the intervening resolution, as is typically done for the minification case. This interpolation takes the conventional form shown in Equation 5 where $X <= Y <= Z$ and $f(LOD[Y])$ is a scale function:

$$\text{texture}(LOD[Y]) = \text{texture}(LOD[X]) + f(LOD[Y]) * (\text{texture}(LOD[Z]) - \text{texture}(LOD[X])) \quad \text{Equation 5}$$

When X is negative (magnification), the base texture LOD[0] is texture(LOD[Z]) in Equation 5. texture(LOD[X]) is not stored but can be derived in accordance with the present invention as shown in Equation 4. In this case, $$\text{texture}(LOD[X]) = \text{texture}([LOD[0]) + \text{detail\_texture}(LOD[X] \rightarrow LOD[0]) \quad \text{Equation 6}$$

This leads to the Equation 7:

$$\text{texture}(LOD[Y]) = \text{texture}(LOD[0]) + (1 - f(LOD[Y])) * \text{detail\_texture}(LOD[X] \rightarrow LOD[0]) \quad \text{Equation 7}$$

Defining a new scale function $F(LOD[Y]) = (1 - f(LOD[Y]))$ allows Equation 7 to be modified to the Equation 8:

$$\text{texture}(LOD[Y]) = \text{texture}(LOD[0]) + F(LOD[Y]) * \text{detail\_texture}(LOD[X] \rightarrow LOD[0]) \quad \text{Equation 8}$$

The present invention shall now be further described in the context of an example. Note that LOD[0] is known, since it is derived from the high resolution source image. Assume that the high resolution source image represents LOD[−4]. Since LOD[0] and LOD[−4] are known, frequency_band_map(LOD[−4−>0]) can be derived since it depends on the images at LOD[0] and LOD[−4] (see Equation 2). In this example, assume that LOD[0] and frequency_band_map(LOD[−4−>0]) are stored. The original high resolution source image (LOD[−4]) is not stored since that would require too much memory. Now assume a user wants to magnify the image to LOD[−2.7]. Since frequency_band_map(LOD[−4−>0]) is known, LOD[−2.7] can be derived based on Equation 8.

As noted above, the present invention preferably operates with high resolution source images having high frequency components which are virtually the same throughout the images (since the high frequency information is not strongly correlated to the low frequency information). In accordance with the present invention, the detail texture (or characteristic frequency band) is equal to a representative sample of the frequency band map. Preferably, the detail texture is stored, not the frequency band map. When magnification to LOD[Y] is required, high-frequency information from the detail texture is added to image(LOD[0]) to generate image(LOD[Y]) using Equation 7 or 8. In the present invention, only LOD[0] and the detail texture are stored. Consequently, the high-resolution image(LOD[Y]) can be generated from the lower-resolution image(LOD[0]) with little or no bluriness, and without the need of large amounts of memory capacity to store texture information.

Equation 8 shows the preferred form of the equation for detail texturing. There are, however, certain types of anomolies that can occur when dealing with multiple component textures (i.e., RED/GREEN/BLUE). In this case, there is a potential that after applying the detail texture the result will not represent the original color. In order to avoid this color shift, the present invention provides a means in which the scaled detail texture is used to scale the texture(LOD[0]) before adding it to texture(LOD[0]) as shown in Equation 9:

$$\text{texture}(LOD[Y]) = \text{texture}(LOD[0]) + F(LOD[Y]) * \text{detail\_texture}(LOD[X] \rightarrow LOD[0]) * \text{texture}(LOD[0]) \quad \text{Equation 9}$$

The scale factor, F(LOD[Y]), is allowed to have an integer component and is a programmable (per texture) function. Consequently, the effect of modifying the base texture LOD[0] with the detail texture can be precisely tuned to match the frequency characteristics of the base texture LOD[0].

The present invention requires knowledge of the high resolution source image (this is apparent from Equation 2. Sometimes, the high resolution source image does not exist. In these cases, a high resolution source image can be approximated based on the base texture LOD[0] and some high frequency detail provided by the user.

II. Detailed Operational Description of the Present Invention

The operation of the present invention, as generally described above, shall now be described in further detail.

Figure 2:
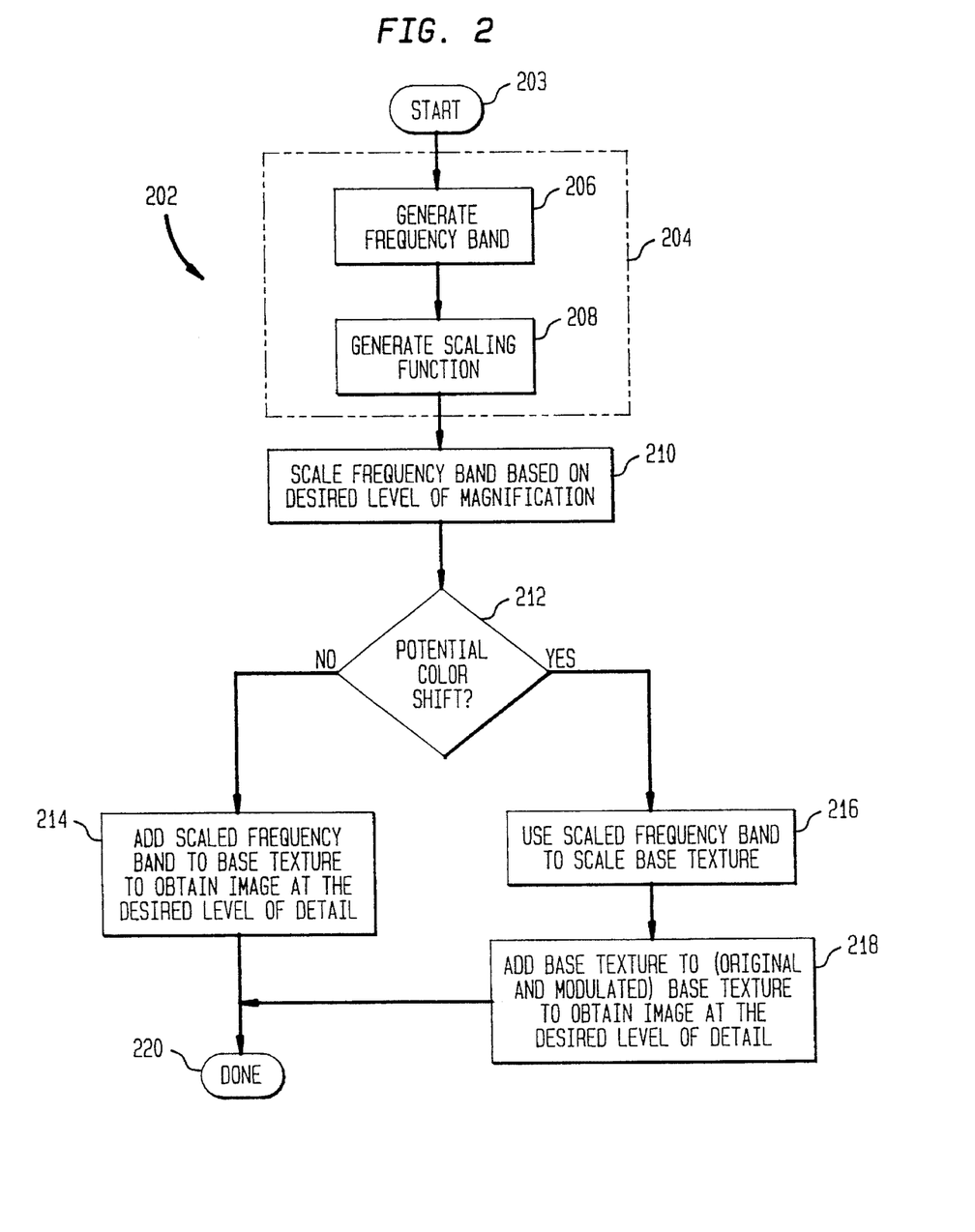
FIG. 2 is a flow chart representing the operation of a preferred embodiment of the present invention.

FIG. 2 is a flowchart 202 representing the operation of a preferred embodiment of the present. The steps of flowchart 202 are executed with respect to magnifying a base texture 352 (see FIG. 3B) up to and including a level of detail (LOD) associated with the original high resolution source image 360, wherein such magnification has fine detail similar to the source image. The flowchart 202 begins at step 203, where control immediately passes to initialization steps 204, which include steps 206 and 208. The initialization steps 204 are performed prior to any attempts at magnifying the base texture 352.

In step 206, the detail texture 360 is generated. Any conventional computer image generation/processing system (operating in accordance with step 206, as described below) can be used to generate the detail texture 360, such as the Crimson VGXT, manufactured by Silicon Graphics Inc., Mountain View, Calif. The manner in which the detail texture 360 is generated in step 206 shall now be described with reference to the flowchart in FIG. 3A and the image flow diagram in FIG. 3B. Note that the steps in FIG. 3A correspond to similarly numbered flow arrows in FIG. 3B.

Figure 3A:
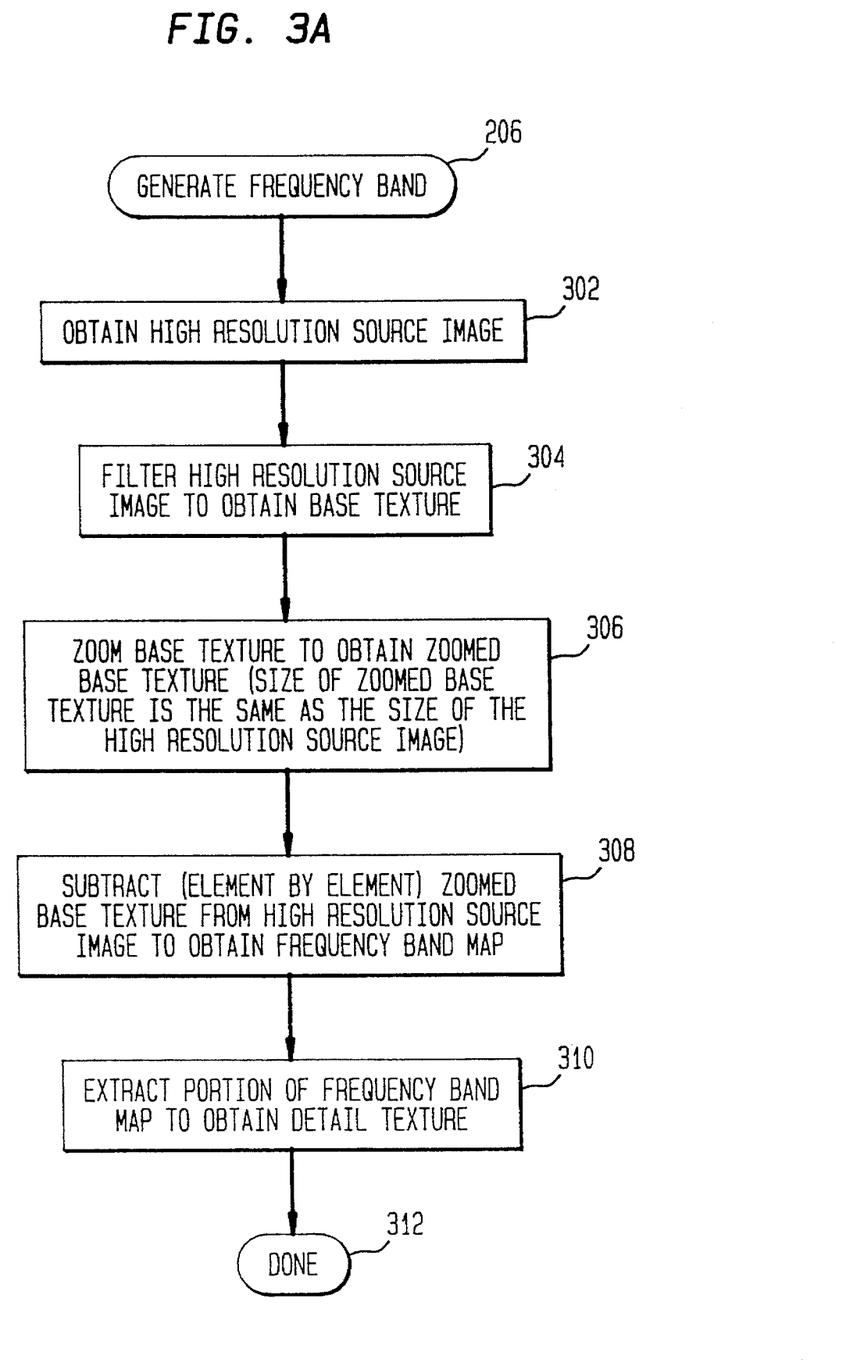
FIG. 3A is a flow chart for generating a frequency band in accordance with a preferred embodiment of the present invention.
Figure 3B:
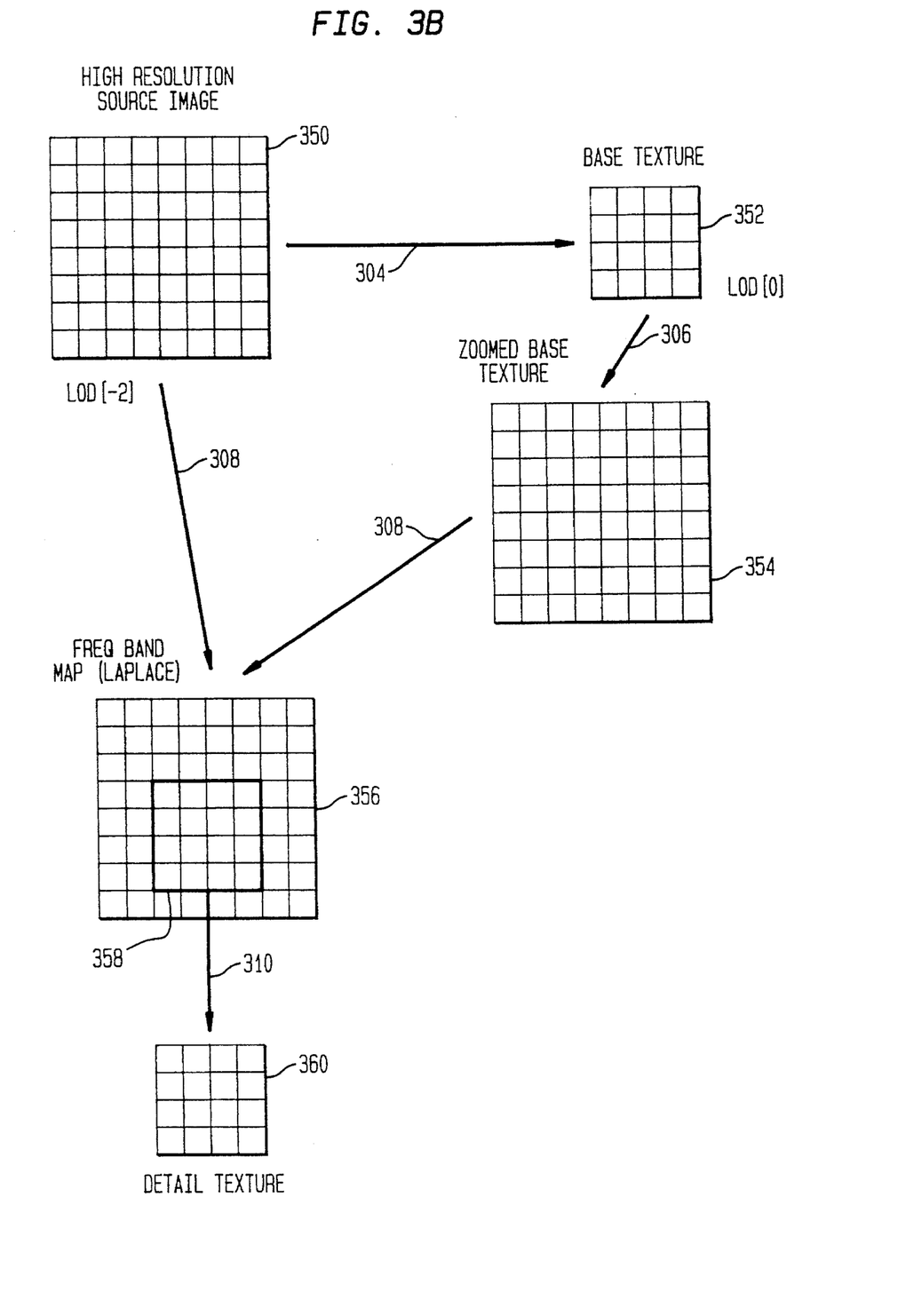
FIG. 3B is an image flow diagram corresponding to the steps of the flow chart of FIG. 3A.

In step 302, a high resolution source image 350 is obtained using any well-known means, such as scanning in a photograph using a conventional image scanner. Alternatively, the source image 350 may be obtained from a computer graphics texture library. The source image 350 is preferably in digital form. This is true of all of the graphic images and textures discussed herein.

In step 304, the high resolution source image 350 is filtered to obtain a lower resolution base texture 352. The base texture 352 represents the image at LOD[0]. Any well known filtering technique can be used in step 304, such as those discussed in *Digital Image Processing*, Kenneth R. Castleman, Prentice-Hall, Englewood Cliffs, N.J., 1979.

In step 306, the base texture 352 is zoomed to obtain a zoomed base texture 354 having a size equal to the size of the high resolution source image 350. For example, if the base texture 352 is a 128×128 texture, and the source image 350 is a 512×512 texture (LOD[−2]), then the base texture 352 is zoomed up to a size of 512×512. The zoom operation in step 306 is implemented using any well-known interpolation operation, wherein the data from the base texture 352 is interpolated as necessary to produce the zoomed base texture 354. Interpolation is described in many publicly available documents, such as *Digital Image Processing* by Kenneth R. Castleman, cited above.

In step 308, elements of the zoomed base texture 354 are subtracted from corresponding elements of the source image 350 to generate a frequency band map 356. The size of the frequency band map 356 is the same as the size of the source image 350.

In step 310, a region of the frequency band map which is representative of the detail imagery in the frequency band map is extracted to generate the detail texture 360. Any region of the frequency band map can be used as the detail texture so long as it does not correspond to a region in the source image which contains edges of large objects, as these edges would be in the detail texture and appear to repeat across the base texture during magnification. The present embodiment preferably uses a 256×256 pixel sized region; however the present invention would work with other sized regions.

Since the detail texture will be repeated across the base texture during magnification, it is sometimes necessary to additionally process the detail texture to make it self repeating. Self-repeating means to make the left edge match the right edge, and the top edge match the bottom. One method for this process is described in "Applying Frequency Domain Constructs to a Broad Spectrum of Visual Simulation Problems," Stephen A. Zimmerman, 1987 Image Conference IV Proceedings, June, 1987, which is herein incorporated by reference in its entirety.

An alternate method which is used to make a self-repeating detail texture is to extract a region of the original image the size the detail texture is to be, and make this sub-image self-repeating using the method described above. The sub-image is zoomed by 2 to the N, where N is the LOD of the original image, to obtain a sub-base image. The sub-base image is zoomed back up to the size of the sub-image, and its elements are subtracted from the corresponding elements of the sub-image to produce the detail texture. Again the region extracted from the original image should not contain edges of large objects and should have fine details representative of the original image as a whole.

Following the completion of step 310, the detail texture 360 has been generated.

Recall that, in step 302 of FIG. 3A, the high resolution source image 350 was obtained. However, a high resolution source image 350 is not always available. A procedure for generating a high resolution source image based on the base texture LOD[0] and some high frequency detail provided by the user shall now be described with reference to the flowchart in FIG. 4A and the image flow diagram in FIG. 4B. Note that the steps in FIG. 4A correspond to similarly numbered flow arrows in FIG. 4B. The steps in FIG. 4A can be performed by any well known computer graphics processing system (operating in accordance with the present invention, as discussed herein).

Figure 4A:
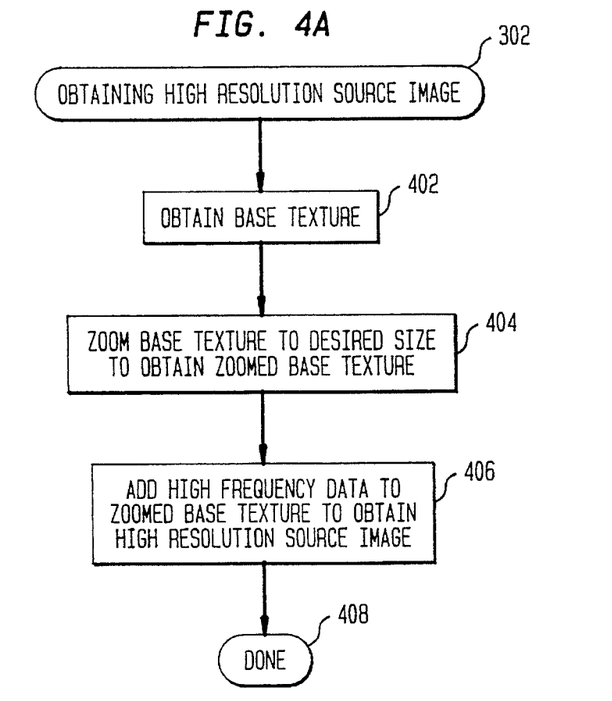
FIG. 4A is a flow chart for generating an approximate high resolution source image from a lower resolution base texture in accordance with a preferred embodiment of the present invention.
Figure 4B:
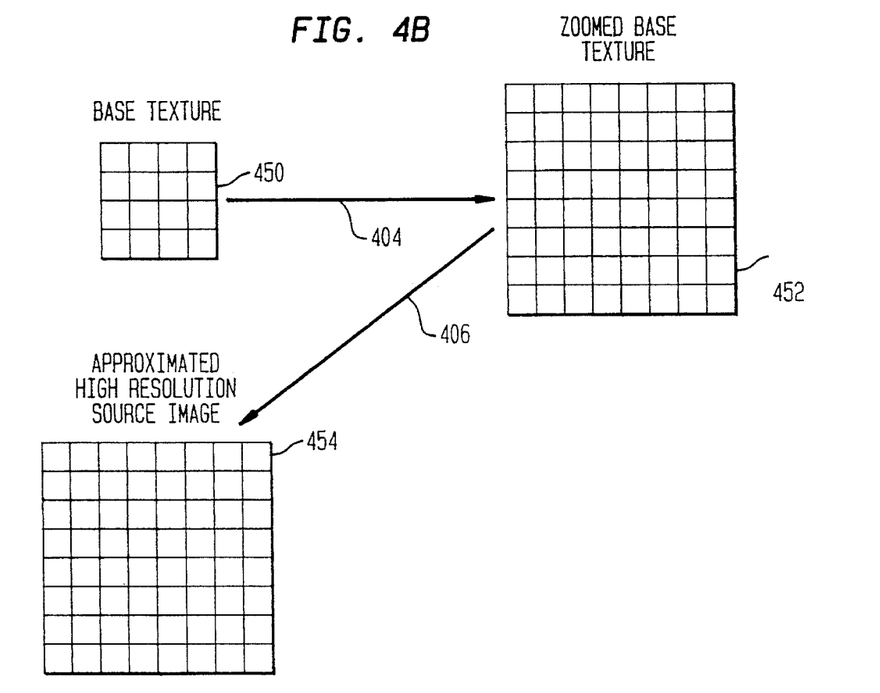
FIG. 4B is an image flow diagram corresponding to the steps of the flow chart of FIG. 4A.

In step 402, a base texture 450 is obtained using any well-known means, such as scanning in a photograph using a conventional image scanner. Alternatively, the base texture 450 may be obtained from a texture library. Step 402 is similar to step 302 in FIG. 3, except that the base texture 450 obtained in step 402 is of a relatively low resolution.

In step 404 the base texture 450 is zoomed to obtain a zoomed base texture 452 having a size equal to the size of a desired high resolution source image 454 (which has not yet been generated). For example, if the base texture 450 is a 128×128 texture, and the desired source image 454 is a 512×512 texture (LOD[−2]), then the base texture 450 is zoomed up to a size of 512×512. The zoom operation in step 404 is similar to step 306 and is implemented using any well-known interpolation operation, wherein the data from the base texture 450 is interpolated as necessary to produce the zoomed base texture 452.

In step 406, high frequency data is added to the zoomed base image 452 to produced an approximated high resolution source image 454. The high frequency data is provided by the user, and may originate by scanning in a photograph using an image scanner, or by using pre-existing texture information from a texture graphics library. The type and content of the high frequency data provided by the user is characteristic of, and will depend on the content of the base texture 450. For example, if the base texture 450 represents an image of a road, then the high frequency data provided by the user may represent an image of gravel.

Following the completion of step 406, the approximated high resolution source image 454 has been generated. The approximated high resolution source image 454 is then used in place of the high resolution source image 350 in the flow chart of FIG. 3A to generate the detail texture 360. Note that, to maintain continuity, a new base texture 354 is generated from the approximated high resolution source image 454 in step 304.

Referring again to FIG. 2, in step 208 a scaling function is generated. As discussed above, the scaling function is a function of the desired level of detail (LOD), or magnification. The scaling function, F(LOD[Y]), is used during both the additive detail mode (see Equation 6) and the multiplicative detail mode (see Equation 7).

In essence, the scaling function controls the amount of high frequency information from the detail texture 360 which is added to each pixel of the base texture 352 during magnification. Preferably, pixels of the base texture 352 may have different levels of detail during magnification, so different scale factors may be associated with the pixels during magnification.

Since source images vary in content, the scaling function is implementation dependent, and should be constructed based on the image content of the high resolution source images being processed. Preferably, a different scaling function is associated with each high resolution source image being processed, although alternatively a scaling function can be used with multiple source images having similar image contents.

Preferably, the scaling function is generated such that little detail is added when the required magnification is close to LOD[0]. This is the case since the magnified image should be relatively similar to the image at LOD[0] when the magnification is close to LOD[0]. In fact, when Y in Equations 8 and 9 is 0, the scale factor should be 0 (since no addition detail is required to generate LOD[0] from LOD [0]). The scaling function should be generated such that more and more detail is added as the magnification level approaches that of the highest resolution image (that is, the high resolution source image 350). When Y equals X in Equations 8 and 9 (that is, a magnification level equal to the resolution of the original source image 350 is required), the scale factor should be 1, such that the full amount of high frequency information from the detail texture 360 is added to the base texture 352.

Figure 5:
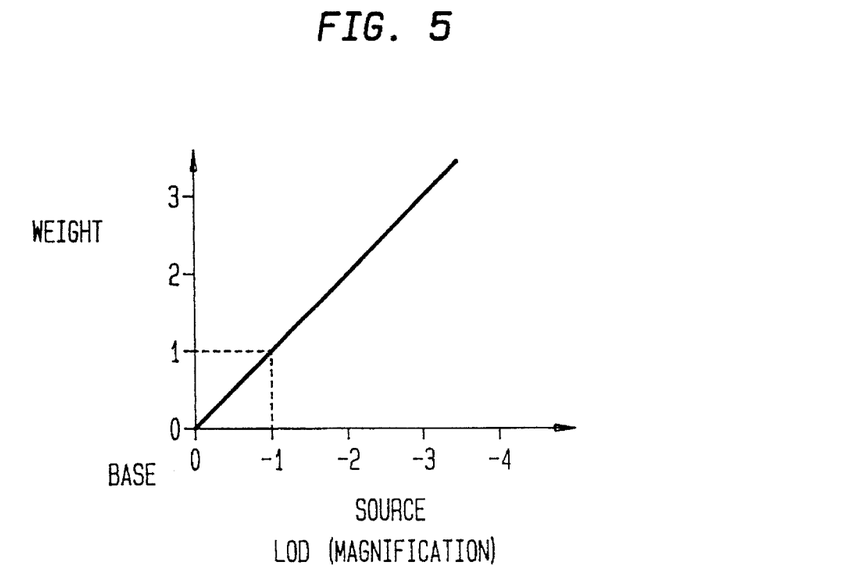
FIGS. 5 and 6 illustrate sample scaling functions.

FIG. 5 illustrates an example scaling function, wherein the X-axis denotes the level of detail (magnification), and the Y-axis denotes the scale factor, or weight. The scaling function in FIG. 5 is linear, with a slope of 1. Other slopes could alternatively be used (although not in the scenario presented in FIG. 5, since the original high resolution image is LOD[-1]). As indicated in FIG. 5, the present invention can be used to magnify an image beyond the level of detail of the source image 350. However, at such levels of detail, bluriness may result.

Figure 6:
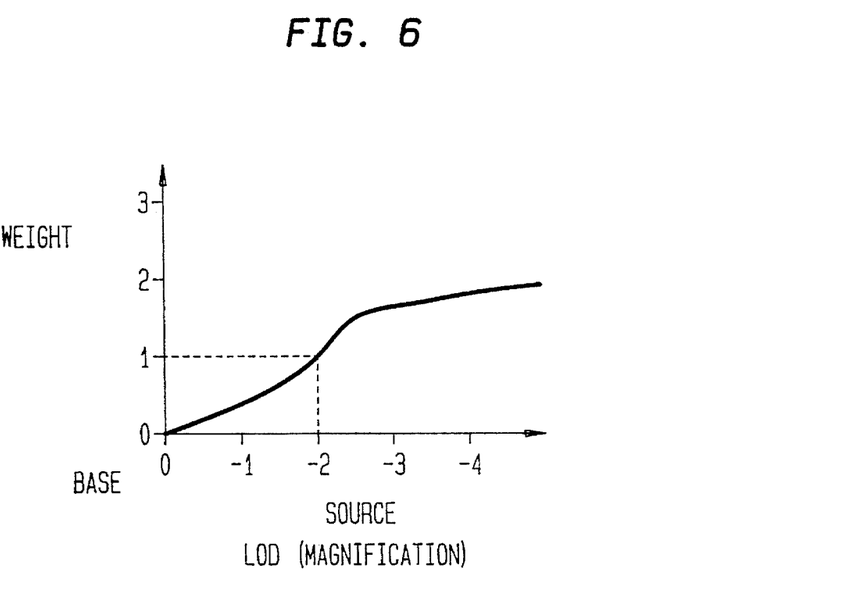

FIG. 6 illustrates another example scaling function, wherein the scaling function is non-linear and peaks at approximately a weight of 1.25. Setting the scaling function to a maximum weight value may reduce bluriness when magnifying beyond the level of detail of the source image 350. In FIG. 6, the original high resolution image represents LOD[-2]. The use of a non-linear scaling function minimizes aliasing between the known LODs.

Preferably, the scaling function is implemented as a look-up table stored in memory (or alternately, implemented in hardware) and addressable by the desired LOD, with the table output being the scale factor. The scope of the present invention encompasses other implementations of the scaling function, such as a state machine or direct calculation implemented in hardware.

Referring again to FIG. 2, after the completion of steps 206 and 208, the base texture 352 can be magnified (in response, for example, from a request from a person operating the interactive computer graphics system). In accordance with the present invention, only the base texture LOD[0] (and any lower resolution textures), the detail texture 360, and the scaling function is maintained by the system. The textures of higher resolution than LOD[0] (including the source image 350) and the frequency band map 356 are not stored.

In step 210, the detail texture 360 (also called the characteristic frequency band) is scaled using the scaling function based on the desired level of detail. Thus, in step 210, the detail texture 360 is scaled using the scaling function based on the desired level of detail associated with each pixel in the rendered image. This is discussed further below.

In step 212, the system determines whether the texture has been tagged as being susceptable to color shift problems. If it is not susceptable, then the additive detail mode, Equation 8, is entered by processing step 214.

In step 214, the scaled detail texture (from step 210) is added to the base texture 352 to obtain the image at the desired level of detail. The manner in which step 214 is performed shall now be described in greater detail with reference to FIGS. 7A, 7B and 7C, which show a base texture 702, a detail texture 706, and a portion 710 of an image 708.

Figure 7A:
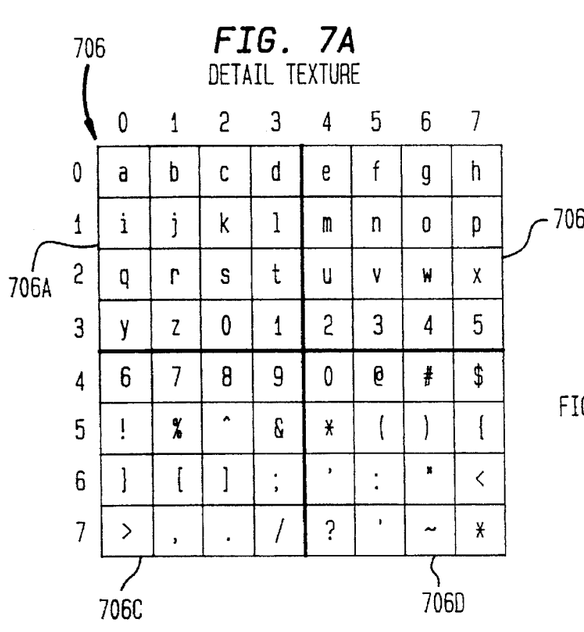
FIGS. 7A, 7B and 7C collectively depict image maps for use in describing features of the present invention.
Figure 7B:
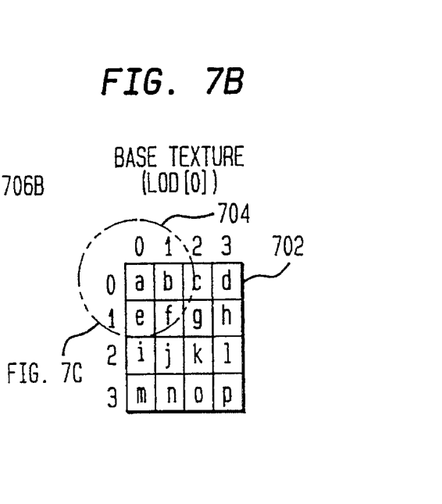

The detail texture 706 is preferably a power-of-two square sized array, although the size of the detail texture 706 may vary among particular implementations. In performing step 214, a subset 706A, 706B, 706C, or 706D of the detail texture 706 is aligned to each texel in the base texture 702. In the example of FIG. 7B, the base texture 702 is a 16×16 map (only a portion is shown) and in FIG. 7A the detail texture 706 is an 8×8 map, representing LOD[-2]. Suppose the source texture (not shown) was 256×256, representing LOD[-4]. When rendering a textured image at LOD[0], each texel in the base texture 702 corresponds to one pixel in the image 708. Rendering a textured image at LOD[-1] requires that each texel in the base texture 702 correspond to approximately a 2×2 pixel area in the image 708. Similarly, rendering a textured image at LOD[-2] requires that each texel in the base texture 702 correspond to approximately a 4×4 pixel area in the image 708 (this is the case shown in FIG. 7A and FIG. 7B).

In order to avoid the blurriness associated with magnification, a unique texture value must be assigned to each pixel in the image 708. Thus, in accordance with a preferred embodiment of the present invention, when rendering a textured image at LOD[-2] each texel in the base texture 702 is covered by a 4×4 subset 706A, 706B, 706C, or 706D of the detail texture 706. This ensures that the image will appear sharp at LOD[-2]. The detail texture 706 can be any size larger than this, with the additional size only providing a larger special area before the detail texture pattern is repeated. In the example of FIG. 7A, the detail texture 706 repeats every 2×2 base texel area.

The addressing of the detail texture 706 during step 214 is as follows. For each texel of the texture 702, a texel address is generated into the texture 702 based on the mapping of the texture 702 to the polygon to which the texture 702 is being applied. The texel address has both an integer and fractional component. Such texel address generation is routinely performed in conventional computer graphics systems and, accordingly, mechanisms and procedures for performing such texel address generation would be apparent to those skill in the relevant art. It should be understood that, conventionally, the generation of texel addresses has no relationship to adding detail to base textures as described herein.

The texel address is preferably used as follows to address the detail texture 706 during step 214. The least significant bits (LSBs) of the integer portion are used to select which section 706A, 706B, 706C, or 706D of the detail texture 706 to use for the texel of the base texture 702 associated with the texel address. In FIG. 7A and FIG. 7B, the detail texture 706 is an 8×8 array and the base texture 702 is a 16×16 array. Thus, each 4×4 section 706A, 706B, 706C, 706D of the detail texture 706 is mapped to one texel of the base texture 702. For example, the section 706A of the detail texture 706 is preferably mapped to the texel of the base texture 702 at coordinate (0,0) (the first coordinate digit corresponds to the row, and the second coordinate digit corresponds to the column). The 2×2 grid of 4×4 sections 706A, 706B, 706C, 706D of the detail texture 706 is the portion addressed by the integer portion of the texel address. Since there are 4 such sections in the detail texture 706, two LSBs of the integer portion are used.

The fractional portion of the texel address is used to select from the texels in the particular section 706A, 706B, 706C, or 706D of the detail texture 706 addressed by the integer portion. Separate X and Y addresses are used to address these texels. Thus, in the example of FIG. 7A, two fractional bits are used for the X address and two fractional bits are used for the Y address.

A single detail texture value may be applied to a single base texture value to provide the final pixel value. Alternatively, however, several base and detail texture values are preferably read and filtered to provide the final pixel value.

Figure 7C:
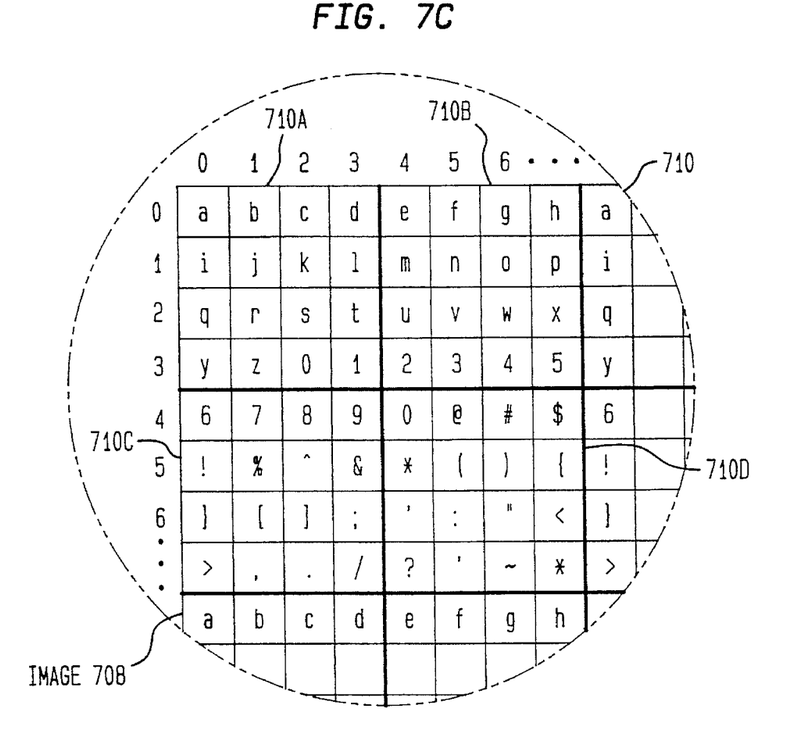

The manner in which a particular pixel value is obtained during step 214 shall now be described (the values of all of the pixels of the image 708 would be obtained in a similar manner). Consider the pixel in the image 708 having coordinates (0,0). Assume that the image 708 represents LOD [−2]; thus, each texel in the base texture 702 corresponds to approximately a 4×4 pixel area 710A, 710B, 710C, or 710D in the image 708.

Preferably, a direct positional relationship exists between the texels of the base texture 702 and the 4×4 pixel areas 710A, 710B, 710C, 710D of the image 708. Thus, the pixel at (0,0) (which is in area 710A of the image 708) corresponds to the texel at (0,0) of the base texture 702.

As discussed above, in rendering the image 708 using the base texture 702 the computer graphics system generates a texel address for the texel at (0,0) using conventional means. Preferably, the integer portion of the texel address maps the texel at (0,0) of the base texture 702 to the section 706A of the detail texture 706 (other mapping schemes could alternatively be used). Also, preferably the fractional portion of the texel address maps the texel at (0,0) of the detail texture 706 to the pixel at (0,0) of the image 708 (again, other mapping schemes could alternatively be used). FIG. 7A and FIG. 7C show the mapping of the entire detail texture 706 to the portion 710 of the image 708 wherein the texel at (0,0) is mapped to the pixel at (0,0), the texel at (0,1) is mapped to the pixel at (0,1), the texel at (0,2) is mapped to the pixel at (0,2), etc.

Thus, a value for the pixel at (0,0) of the image 708 is obtained during step 214 as follows. The level of detail associated with the texel (0,0) of the base texture 702 is obtained from the scaling function (preferably, by accessing a look-up table). Assume that the scale value for the texel at (0,0) of the base texture 702 is 0.85. The texel value "a" from the texel at (0,0) of the detail texture 706 is scaled using the scale value to obtain a scaled detail texel value of 0.85*a (step 210). The texel value "A" from the texel at (0,0) of the base texture 702 is added to the scaled detail texel value to thereby obtain a value of A+0.85*a for the pixel at (0,0) of the image 708 (step 214).

Referring again to FIG. 2, if in step 212 it is determined that the texture has been pre-tagged as susceptable to color shift problems, then the multiplicative detail mode, Equation 9, is entered by processing steps 216 and 218.

In step 216, the scaled detail texture (from step 210) is used to scale the base texture 352 to obtain a scaled base texture.

In step 218, the scaled base texture is added to the base texture to obtain the image at the desired level of detail.

Steps 216 and 218 are similar to step 214; however, steps 216 and 218 have an additional scale operation. For illustrative purposes, considered again the process of obtaining a value for the pixel at (0,0) of the image 708, this time during steps 216 and 218 (the values of all of the pixels of the image 708 would be obtained in a similar manner). The level of detail associated with the texel (0,0) of the base texture 702 is obtained from the scaling function (preferably, by accessing a look-up table). Assume that the scale value for the texel at (0,0) of the base texture 702 is 0.85. The texel value "a" from the texel at (0,0) of the detail texture 706 is scaled using the scale value to obtain a scaled detail texel value of 0.85*a (step 210). The texel value "A" from the texel at (0,0) of the base texture 702 is scaled using the scaled detail texel value to obtain a scaled base texel value of 0.85*a*A (step 216). The texel value "A" from the texel at (0,0) of the base texture 702 is added to the scaled base texel value of 0.85*a*A to thereby obtain a value of A+0.85*a*A for the pixel at (0,0) of the image 708 (step 218).

As noted above, each texel in the base texture has a level of detail and, thus, in step 210 the detail texture 360 is scaled using the scaling function based on the desired level of detail associated with each texel in the base texture. Alternative, levels of detail can be associated with each pixel of the image 708. The operation of the present invention in accordance with this alternate embodiment would be the same as described above, except that during step 210 the detail texture would be scaled using the scaling function based on the desired level of detail associated with each pixel in the image.

III. Implementation

Figure 8:
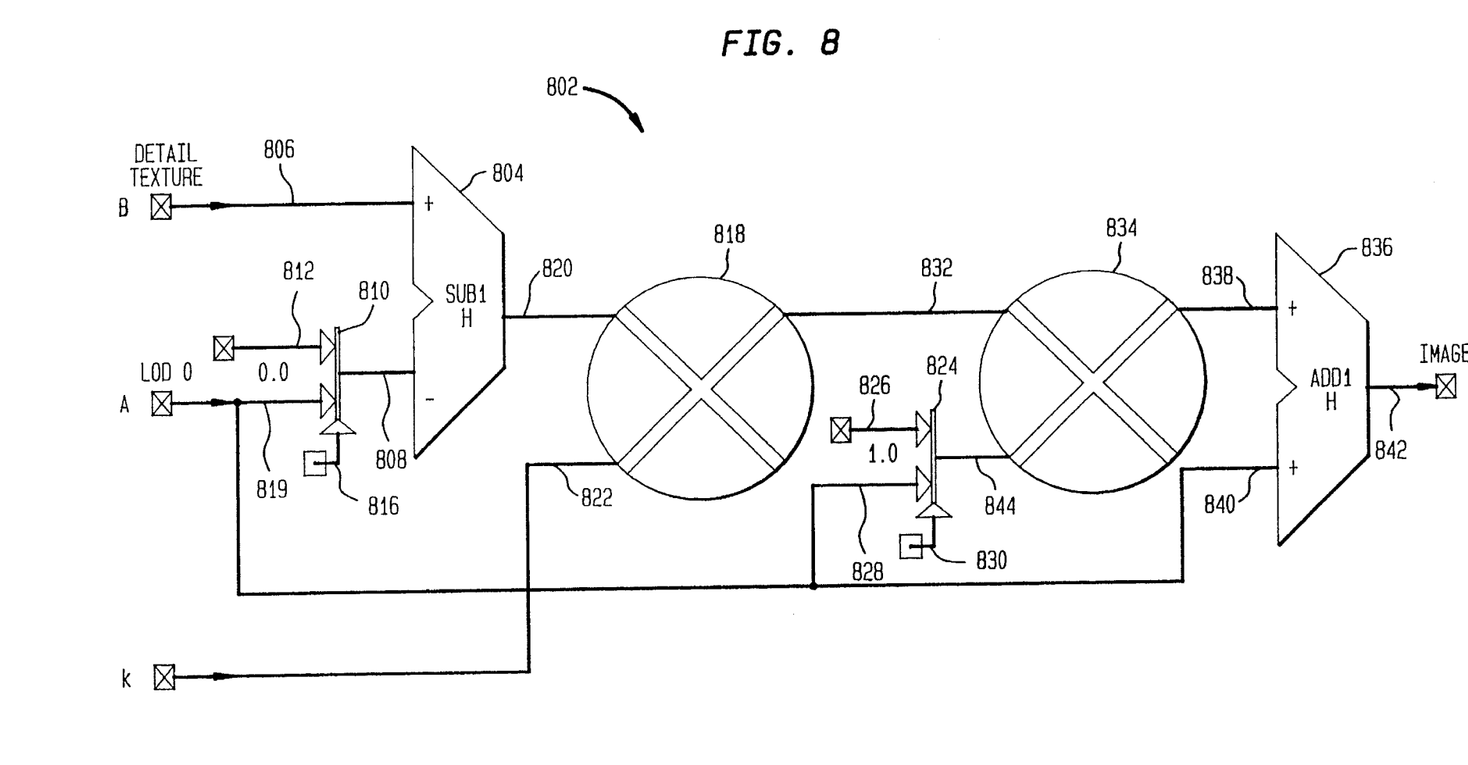
FIG. 8 is a block diagram of an apparatus for adding high frequency detail to a low resolution texture in accordance with a preferred embodiment of the present invention.

FIG. 8 is a block diagram of a preferred apparatus 802 operating in accordance with the present invention. The apparatus 802 operates in both the additive detail mode and the multiplicative detail mode of the present invention. As described below, the apparatus 802 can also implement conventional interpolation operations (also conventionally called minification). Thus, the present invention can be easily incorporated into existing interactive computer graphics systems, thereby further enhancing the utility of the present invention.

The apparatus 802 preferably includes a subtracter 804, an adder 836, two multipliers 818, 834, and two multiplexers 810, 824. The apparatus 802 includes three inputs (labelled A, B, and K) and one output (labelled Image). Each of the inputs may represent a single wire (for serial operation) or multiple wires (for parallel operation). While operating in either the additive detail mode or the multiplicative detail mode, the input A receives signals corresponding to the base texture LOD[0]. The input B receives signals corresponding to the detail texture. The input K receives signals corresponding to scale factors from the scaling functions. It is assumed that the detail texture and the scaling functions have been generated as described above (using, for example, a conventional computer graphics system). It is also assumed that the signals corresponding to the correct scale factors from the scaling functions are being presented on input K (selection of the correct scale factors from the scaling functions is described above).

The subtracter 804 has a positive input 806 and a negative input 808, and receives signals representing input B on the positive input 806. The multiplexer 810 determines whether the subtracter 804 receives signals representing a 0.0 value, or signals representing input A, on the negative input 808. Whether the multiplexer 810 routes 0.0 or input A to the negative input 808 of the subtracter 804 depends on a multiplexer control signal 816, which is connected to a control mechanism (not shown), which operates in accordance with the determination made in step 212 (FIG. 2). The logic of the control mechanism connected to multiplexer control signal 816 is shown in Table 1.

TABLE 1

| Operation | Signal Routed to Negative Input 808 |
|---|---|
| Interpolation | Input A |
| Additive Detail | 0 |
| Multiplication Detail | 0 |

The multiplier 818 multiplies the output 820 of the subtracter 804 and signals representing the k input. The output 832 of the multiplier 818 is provided to the multiplier 834. The multiplier 834 also receives via the multiplexer 824 either signals representing a 1.0 value, or signals representing input A. Whether the multiplexer 824 routes 1.0 or input A to the multiplier 834 depends on a multiplexer control signal 830, which is connected to a control mechanism (not shown), which operates in accordance with the determination made in step 212 (FIG. 2). The logic of the control mechanism connected to the multiplexer control signal 830 is shown in Table 2.

TABLE 2

| Operation | Signal Routed to Multiplier 834 |
|---|---|
| Interpolation | 1 |
| Additive Detail | 1 |
| Multiplication Detail | Input A |

The adder 836 adds the output 838 of the multiplier 834 and signals representing the input k to thereby produce signals representing the image to be displayed.

In accordance with the logic in Tables 1 and 2, when the apparatus 802 is operating in the additive detail mode, the signals generated by the apparatus 802 (at the Image output) may be represented as follows:

$$\text{Image}=A+Bk \qquad \text{Equation 10}$$

Since input A receives signals corresponding to the base texture LOD[0], input B receives signals corresponding to the detail texture, and input K receives signals corresponding to scale factors from the scaling functions, Equation 10 is equivalent to the following (for LOD[−N]):

$$\text{image}(LOD[-N])=\text{image}(LOD[0])+F(LOD[-N])*\text{frequency\_band}(LOD[-X]) \qquad \text{Equation 11}$$

In accordance with the logic in Tables 1 and 2, when the apparatus 802 is operating in the multiplicative detail mode, the signals generated by the apparatus 802 (at the Image output) may be represented as follows:

$$\text{image}=A+ABK \qquad \text{Equation 12}$$

Since input A receives signals corresponding to the base texture LOD[0], input B receives signals corresponding to the detail texture, and input K receives signals corresponding to scale factors from the scaling functions, Equation 12 is equivalent to the following (for LOD[−N]):

$$\text{image}(LOD[-N])=\text{image}(LOD[0])+F(LOD[-N])*\text{frequency\_band}(LOD[-X]*\text{image}(LOD[0]) \qquad \text{Equation 13}$$

Thus, the apparatus 802 properly implements the additive detail mode and the multiplicative detail mode of the present invention.

In accordance with the logic in Tables 1 and 2, when the apparatus 802 is performing a conventional interpolation operation, the signals generated by the apparatus 802 (at the Image output) may be represented as follows:

$$\text{Image}=A+(B-A)k \qquad \text{Equation 14}$$

In accordance with the present invention, when the apparatus 802 is performing an interpolation operation, input A receives signals corresponding to LOD[N], input B receives signals corresponding to LOD[N+1], and input K receives signals corresponding to the fractional portion of the desired level of detail (for example, 0.4 for LOD=2.4). Thus, Equation 14 is equivalent to the following:

$$\text{Image}=\text{image}(LOD[N])+(\text{image}(LOD[N+1])-\text{image}(LOD[N]))*k \qquad \text{Equation 15}$$

As will be apparent to those skilled in the relevant art, Equation 15 is the equation for conventional interpolation. Note that Equation 14 is very similar to Equations 10 and 12. Consequently, the present invention can be easily incorporated into existing interactive computer graphics systems.

The apparatus 802 is preferably implemented in hardware using conventional arithmetic and/or logic components, such as adders, inverters, multipliers, shifters, multiplexers, and/or arithmetic logic units (ALU). Alternatively, the apparatus 802 may be implemented using a programmable logic array (PLA), or using a custom integrated circuit chip.

In another embodiment, the present invention is implemented using a computer and software, wherein the software when executed in the computer enables the computer to operate in accordance with the present invention as discussed herein. The software is implemented to embody the operational features of the invention as discussed herein, such as (but not limited to) those operational features encompassed in the flowcharts of FIGS. 2, 3A, and 4A. Based on the disclosure of the invention contained herein, the structure and operation of the software would be apparent to persons skilled in the relevant art.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus for interactively magnifying a base texture to generate an unblurred magnified image of the base texture, said apparatus adapted for use with an interactive computer graphics processing system, said apparatus comprising:

a base texture generator for filtering a high resolution source image to generate a base texture, said high resolution source image comprising high frequency information and low frequency information, said high frequency information being not strongly correlated with said low frequency information;

a detail texture generator for extracting a representative portion of said high frequency information from said source image to generate a detail texture, said detail texture comprising said extracted representative portion of high frequency information; and an image magnifier, coupled to said base texture generator and said detail texture generator, for augmenting said generated base texture with high frequency information from said detail texture to thereby generate a magnified image of said generated base texture.

2. The apparatus of claim 1, wherein said detail texture generator comprises:

zoomed base texture generating means, coupled to said base texture generator, for zooming said generated base texture to dimensions of said source image to generate a zoomed base texture having a size equal to a size of said source image;

frequency band map generating means for subtracting each element of said zoomed base texture from a corresponding element of said source image to generate a frequency band map, information in said frequency band map representing high frequency information from said source image; and means for extracting a representative portion of information from said frequency band map to generate said detail texture, said detail texture comprising said extracted representative portion of information from said frequency band map.

3. The apparatus of claim 2, wherein said zoomed base texture generating means comprises means for replicating information from said generated base texture, and for storing said replicated information in selected elements of said zoomed base texture.

4. The apparatus of claim 1 in which said generated base texture can be magnified to multiple levels of detail, wherein said image magnifier comprises scaled detail texture generating means for scaling said detail texture in accordance with a particular level of detail to generate a scaled detail texture, said scaled detail texture comprising said high frequency information from said detail texture for augmenting said generated base texture.

5. The apparatus of claim 4, wherein said scaled detail texture generating means comprises:

scale factor generating means for generating scale factors each associated with one of said levels of detail, said scale factors enabling said image magnifier to control the amount of high frequency information from said detail texture to use to augment said generated base texture during magnification of said generated base texture; and a multiplier to multiply said detail texture with a particular one of said scale factors associated with said particular level of detail to thereby generate said scaled detail texture.

6. The apparatus of claim 4, wherein said image magnifier further comprises an adder to add said generated base texture to said scaled detail texture to thereby generate a magnified image of said generated base texture at said particular level of detail.

7. The apparatus of claim 4, wherein said image magnifier further comprises:

a multiplier to multiply said scaled detail texture with said generated base texture to generate a scaled base texture; and an adder to add said generated base texture to said scaled base texture to thereby generate a magnified image of said generated base texture at said particular level of detail.

8. The apparatus of claim 1, further comprising high resolution source image generating means for generating said high resolution source image, said high resolution source image generating means comprising:

means for zooming a low resolution source image to dimensions of a desired high resolution source image to generate a zoomed low resolution source image having a size equal to a size of said desired high resolution source image; and means for adding high frequency information characteristic of said desired high resolution source image to said zoomed low resolution source image to thereby generate said high resolution source image.

9. A method of magnifying a base texture to generate an unblurred magnified image of the base texture, said method comprising the steps of:

(a) filtering a high resolution source image to generate a base texture, said high resolution source image comprising high frequency information and low frequency information, said high frequency information being not strongly correlated with said low frequency information;

(b) extracting a representative portion of said high frequency information from said source image to generate a detail texture, said detail texture comprising said extracted representative portion of high frequency information; and (c) augmenting said generated base texture with high frequency information from said detail texture to thereby generate a magnified image of said generated base texture.

10. The method of claim 9, wherein step (b) comprises the steps of:

(i) zooming said generated base texture to dimensions of said source image to generate a zoomed base texture having a size equal to a size of said source image;

(ii) subtracting each element of said zoomed base texture from a corresponding element of said source image to generate a frequency band map, information in said frequency band map representing high frequency information from said source image; and (iii) extracting a representative portion of information from said frequency band map to generate said detail texture, said detail texture comprising said extracted representative portion of information from said frequency band map.

11. The method of claim 10, wherein step (i) comprises the steps of replicating information from said generated base texture, and storing said replicated information in selected elements of said zoomed base texture.

12. The method of claim 9 in which said generated base texture can be magnified to multiple levels of detail, further comprising the step of:

(d) scaling said detail texture in accordance with a particular level of detail to generate a scaled detail texture, said scaled detail texture comprising said high frequency information from said detail texture for augmenting said generated base texture.

13. The method of claim 12, wherein step (d) comprises the steps of:

generating scale factors each associated with one of said levels of detail, said scale factors enabling control of the amount of high frequency information from said detail texture to use to augment said generated base texture during magnification of said generated base texture; and multiplying said detail texture with a particular one of said scale factors associated with said particular level of detail to thereby generate said scaled detail texture.

14. The method of claim 12, wherein step (c) comprises the step of adding said generated base texture to said scaled detail texture to thereby generate a magnified image of said generated base texture at said particular level of detail.

15. The method of claim 12, wherein step (c) comprises the steps of:

multiplying said scaled detail texture and said generated base texture to generate a scaled base texture; and adding said generated base texture to said scaled base texture to thereby generate a magnified image of said generated base texture at said particular level of detail.

16. The method of claim 9, further comprising the step of:

(d) generating said high resolution source image, comprising:

(i) zooming a low resolution source image to dimensions of a desired high resolution source image to generate a zoomed low resolution source image having a size equal to a size of said desired high resolution source image; and (ii) adding high frequency information characteristic of said desired high resolution source image to said zoomed low resolution source image to thereby generate said high resolution source image.

17. An apparatus for interactively magnifying a base texture to generate an unblurred magnified image of the base texture, said apparatus comprising:

a base texture generator for filtering a high resolution source image to generate a base texture;

a detail texture generator for extracting a representative portion of high frequency information from said source image to generate a detail texture, said detail texture comprising said extracted representative portion of high frequency information;

scale factor generating means for generating a scale factor for a particular level of detail;

a first multiplier, coupled to said detail texture generator and said scale factor generating means, for multiplying signals representing said detail texture with signals representing said scale factor to thereby generate a scaled detail texture for said particular level of detail;

a second multiplier having a first input and a second input, the first input being coupled to said first multiplier, for multiplying signals present on said first input with signals present on said second input to thereby generate a scaled base texture, said first input receiving signals from said first multiplier representing said scaled detail texture;

a selector, coupled to said base texture generator and said second input of said second multiplier, for routing signals representing the generated base texture to said second input when said base texture represents a color image, and for routing signals representing a value of 1.0 to said second input when said base texture represents an intensity image; and an adder, coupled to said second multiplier and said base texture generator, for adding signals representing said generated base texture to signals representing said scaled base texture to thereby generate a magnified image of said generated base texture at said particular level of detail.

18. A method of interactively magnifying a base texture to generate an unblurred magnified image of the base texture, said method comprising the steps of:

filtering a high resolution source image to generate a base texture;

extracting a representative portion of high frequency information from said source image to generate a detail texture, said detail texture comprising said extracted representative portion of high frequency information;

generating a scale factor for a particular level of detail;

multiplying signals representing said detail texture with signals representing said scale factor to thereby generate a scaled detail texture for said particular level of detail;

determining whether said base texture represents a color image or an intensity image;

multiplying signals representing said scaled detail texture with signals representing the generated base texture to thereby generate a scaled base texture when said base texture represents a color image;

adding signals representing said generated base texture to signals representing said scaled base texture to thereby generate a magnified image of said generated base texture at said particular level of detail when said base texture represents a color image; and adding signals representing said generated base texture to signals representing said scaled detail texture to thereby generate a magnified image of said generated base texture at said particular level of detail when said base texture represents an intensity image.

\* \* \* \* \*